US010403020B2

(12) United States Patent
Habib et al.

(10) Patent No.: US 10,403,020 B2
(45) Date of Patent: Sep. 3, 2019

(54) TECHNIQUES FOR GENERATING DYNAMIC ILLUSTRATIONS USING PRINCIPLES OF ANIMATION

(71) Applicant: Autodesk, Inc., San Rafael, CA (US)

(72) Inventors: Rubiait Habib, Toronto (CA); Tovi Grossman, Toronto (CA); Nobuyuki Umetani, Toronto (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 33 days.

(21) Appl. No.: 15/133,103

(22) Filed: Apr. 19, 2016

(65) Prior Publication Data

US 2017/0301126 A1 Oct. 19, 2017

(51) Int. Cl.
*G06T 13/80* (2011.01)
*G06T 3/00* (2006.01)
*G06T 13/40* (2011.01)

(52) U.S. Cl.
CPC ......... *G06T 13/80* (2013.01); *G06T 3/00* (2013.01); *G06T 3/0093* (2013.01); *G06T 13/40* (2013.01)

(58) Field of Classification Search
CPC ......... G06T 13/80; G06T 13/20; G06T 13/40; G06T 13/60; G06T 2213/00–12; G06T 2200/24; G06F 3/04817; G06F 3/0482
See application file for complete search history.

(56) References Cited

U.S. PATENT DOCUMENTS

2009/0213143 A1* 8/2009 Igarashi ............... G06T 3/0093
345/643
2013/0162681 A1* 6/2013 Peterson ............... G06T 3/0093
345/647

OTHER PUBLICATIONS

Kazi et al. (NPL "Draco: bringing life to illustrations with kinetic textures") Citation: Kazi, Rubaiat Habib, et al. "Draco: bringing life to illustrations with kinetic textures." Proceedings of the SIGCHI Conference on Human Factors in Computing Systems. ACM, 2014.*
Bret Victor (NPL Video: "Stop Drawing Dead Fish") Citation: Bret Victor, "Stop Drawing Dead Fish", URL https://vimeo.com/64895205, 2013.*

(Continued)

*Primary Examiner* — Diane M Wills
(74) *Attorney, Agent, or Firm* — Artegis Law Group, LLP

(57) ABSTRACT

An animation engine is configured to apply motion amplifiers to sketches received from an end-user in order to create exaggerated, cartoon-style animation. The animation engine receives a sketch input from the end-user as well as a selection of one or more motion amplifiers. The animation engine also receives one or more control sketches that indicate how the selected motion amplifiers are applied to the sketch input. The animation engine projects the sketch input onto a sketch grid to create a sketch element, and then animates the sketch element by deforming the underlying sketch grid based on the control sketches. The animation engine then interpolates the sketch input, based on the deformations of the sketch grid, to animate the sketch. In this manner, the animation engine exposes an intuitive set of tools that allows end-users to easily apply the well-known Principles of Animation.

19 Claims, 12 Drawing Sheets

(56) References Cited

OTHER PUBLICATIONS

Faloutsos et al. (NPL "Dynamic Free-Form Deformations for Animation Synthesis") Citation: Faloutsos, Petros, Michiel Van De Panne, and Demetri Terzopoulos. "Dynamic free-form deformations for animation synthesis." IEEE Transactions on visualization and computer graphics 3.3 (1997): 201-214.*

Bret Victor, Vimeo Video: "Stop Drawing Dead Fish", URL https://vimeo.com/648952065, 2013, 4:52-5:20, 6:43, 6:46-6:55, 7:02-7:06, 7:28-7:38, 7:50, 30:49, 31:57, 32:26, 32:45, 39:03, and 40:45 .*

Liu, Songrun, Alec Jacobson, and Yotam Gingold. "Skinning cubic Bézier splines and Catmull-Clark subdivision surfaces." ACM Transactions on Graphics (TOG) 33.6 (2014): 190. (Year: 2014).*

Bregler, C., Loeb, L., Chuang, E., & Deshpande, H. (Jul. 2002). Turning to the masters: motion capturing cartoons. In ACM Transactions on Graphics.

Bruderlin, A., & Williams, L. (Sep. 1995). Motion signal processing. In Proceedings of the 22nd annual conference on Computer graphics and interactive techniques (pp. 97-104). ACM.

Chenney, S., Pingel, M., Iverson, R., & Szymanski, M. (Jun. 2002). Simulating cartoon style animation. In Proceedings of the 2nd international symposium on Non-photorealistic animation and rendering (pp. 133-138). ACM.

Chuang, Y. Y., Goldman, D. B., Zheng, K. C., Curless, B., Salesin, D. H., & Szeliski, R. (Jul. 2005). Animating pictures with stochastic motion textures. InACM Transactions on Graphics (TOG) (vol. 24, No. 3, pp. 853-860). ACM.

Coros, S., Martin, S., Thomaszewski, B., Schumacher, C., Sumner, R., & Gross, M. (2012). Deformable objects alive!. ACM Transactions on Graphics (TOG), 31(4), 69.

Dalstein, B., Ronfard, R., & Van de Panne, M. (2015). Vector Graphics Animation with Time-Varying Topology. ACM Transactions on Graphics, 12.

Davis, R. C., Colwell, B., & Landay, J. A. (Apr. 2008). K-sketch: A kinetic sketch pad for novice animators. In Proceedings of the SIGCHI Conference on Human Factors in Computing Systems (pp. 413-422). ACM.

Faloutsos, P., Van De Panne, M., & Terzopoulos, D. (1997). Dynamic free-form deformations for animation synthesis. Visualization and Computer Graphics, IEEE Transactions on, 3(3), 201-214.

Gilland, J. (2012). Elemental Magic: The Art of Special Effects Animation. CRC Press.

Guay, M., Ronfard, R., Gleicher, M., & Cani, M. P. (2015). Space-time sketching of character animation. ACM Transactions on Graphics (TOG), 34(4), 1.

Guay, M., Ronfard, R., Gleicher, M., & Cani, M. P. (May 2015). Adding dynamics to sketch-based character animations. In Sketch-Based Interfaces and Modeling (SBIM) 2015.

Haller, M., Hanl, C., & Diephuis, J. (2004). Non-photorealistic rendering techniques for motion in computer games. computers in Entertainment (CIE),2(4), 11-11.

Igarashi, T., Moscovich, T., & Hughes, J. F. (2005). As-rigid-as-possible shape manipulation. ACM transactions on Graphics (TOG), 24(3), 1134-1141.

Joshi, N., Mehta, S., Drucker, S., Stollnitz, E., Hoppe, H., Uyttendaele, M., & Cohen, M. (Oct. 2012). Cliplets: juxtaposing still and dynamic imagery. In Proceedings of the 25th annual ACM UIST (pp. 251-260). ACM.

Kazi, R. H., Chevalier, R, Grossman, T., & Fitzmaurice, G. (Oct. 2014). Kitty: Sketching dynamic and interactive illustrations. In Proceedings of the 27th annual ACM symposium on User interface software and technology (pp. 395-405). ACM.

Kazi, R. H., Chevalier, R, Grossman, T., Zhao, S., & Fitzmaurice, G. (Apr. 2014). Draco: Bringing life to illustrations with kinetic textures. In Proceedings of the 32nd annual ACM conference on Human factors in computing systems (pp. 351-360). ACM.

Koyama, Y., Takayama, K., Umetani, N., & Igarashi, T. (Jul. 2012). Real-time example-based elastic deformation. In Proceedings of the 11th ACM SIGGRAPH/Eurographics conference on Computer Animation (pp. 19-24). Eurographics Association.

Lasseter, J. (Aug. 1987). Principles of traditional animation applied to 3D computer animation. In ACM Siggraph computer Graphics (vol. 21, No. 4, pp. 35-44). ACM.

Martin, S., Thomaszewski, B., Grinspun, E., & Gross, M. (2011). Example-based elastic materials. ACM Transactions on Graphics (TOG), 30(4), 72.

Moscovich, T., Igarashi, T., Rekimoto, J., Fukuchi, K., & Hughes, J. F. (2005). A multi-finger interface for performance animation of deformable drawings.Proc. of User Interface Software and Technology (UIST'05), Seattle, WA, ACM Press.

Müller, M., Heidelberger, B., Teschner, M., & Gross, M. (Jul. 2005). Meshless deformations based on shape matching. In ACM Transactions on Graphics (TOG) (vol. 24, No. 3, pp. 471-478). ACM.

Papert, S. (1980). Mindstorms: Children, computers, and powerful ideas. Basic Books, Inc.

Schmid, J., Sumner, R. W., Bowles, H., & Gross, M. (2010). Programmable motion effects. SIGGRAPH'10: ACM SIGGRAPH 2010 papers, 1-9.

Schödl, A., Szeliski, R., Salesin, D. H., & Essa, I. (Jul. 2000). Video textures. In Proceedings of the 27th annual conference on Computer graphics and interactive techniques (pp. 489-498). ACM Press/Addison-Wesley Publishing Co.

Thorne, M., Burke, D., & van de Panne, M. (Aug. 2007). Motion doodles: an interface for sketching character motion. In ACM SIGGRAPH 2007 courses (p. 24). ACM.

Victor, B. (2009). Drawing Dynamic Visualizations. CUSE, https://vimeo.com/66085662.

Wang, J., Drucker, S. M., Agrawala, M., & Cohen, M. F. (Jul. 2006). The cartoon animation filter. In ACM Transactions on Graphics (TOG) (vol. 25, No. 3, pp. 1169-1173). ACM.

Zhu, B., Iwata, M., Haraguchi, R., Ashihara, T., Umetani, N., Igarashi, T., & Nakazawa, K. (Dec. 2011). Sketch-based dynamic illustration of fluid systems. In ACM Transactions on Graphics (TOG) (vol. 30, No. 6, p. 134). ACM.

Thomas F. Johnson et al, "The Illusion of life: Disney animation", (1995), New York: Hyperion, pp. 306-312.

* cited by examiner

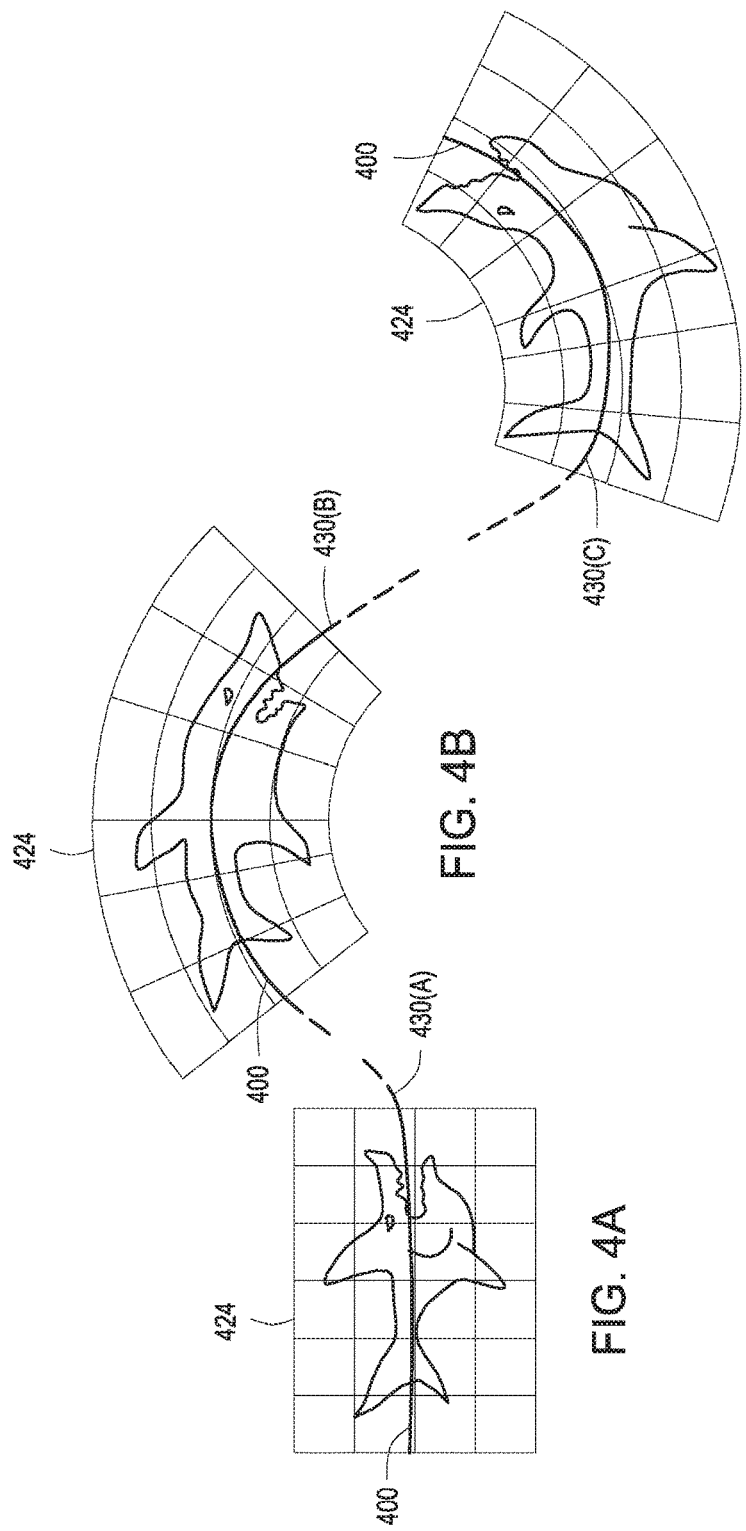

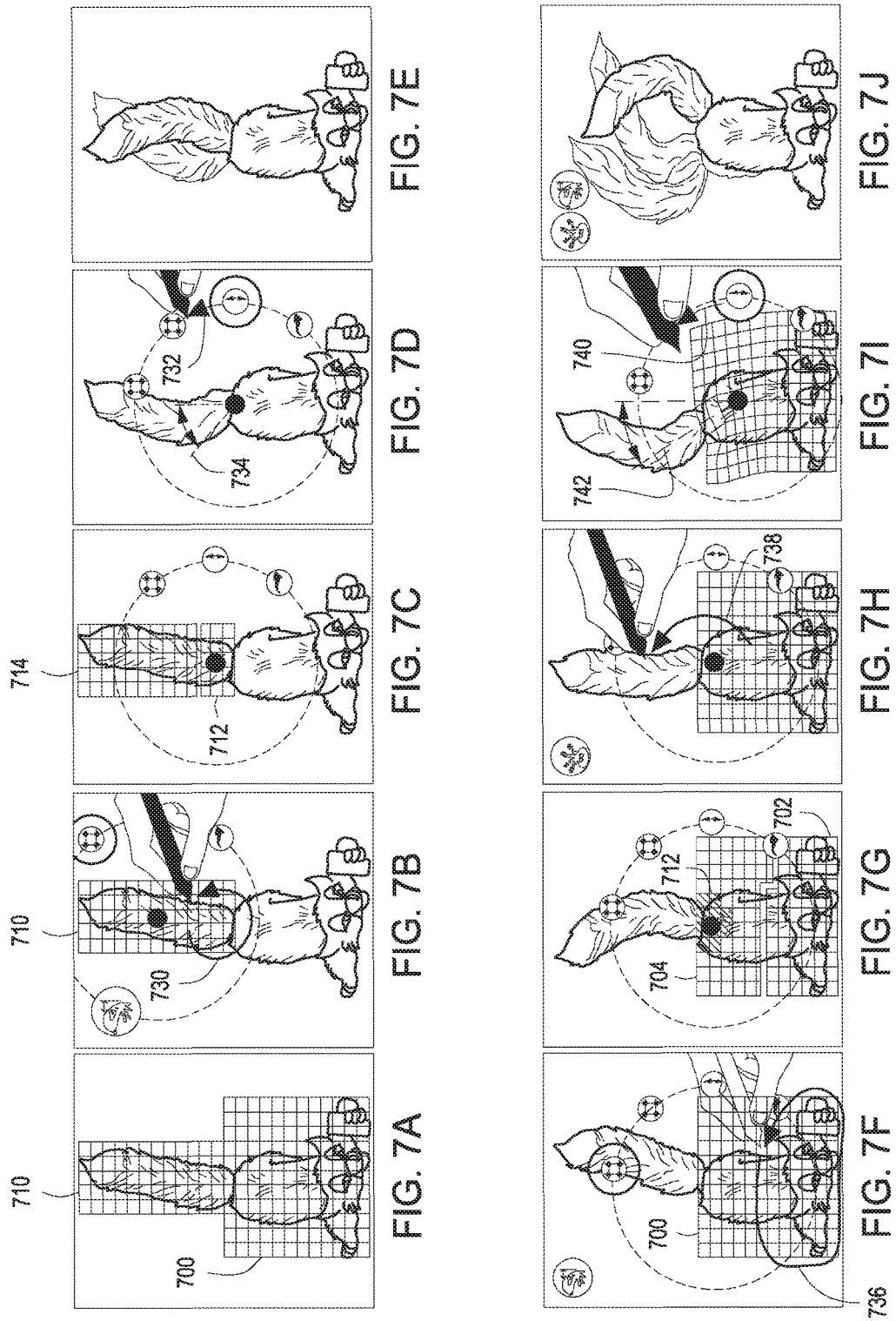

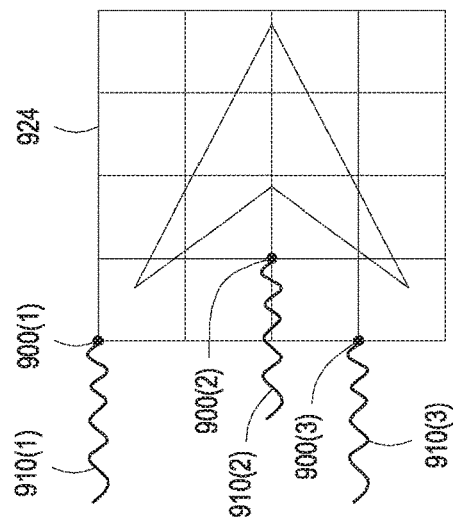
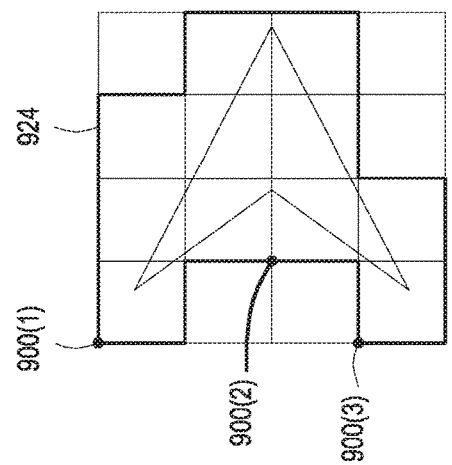
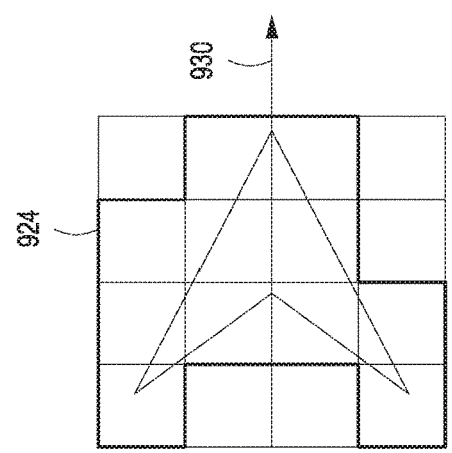

TECHNIQUES FOR GENERATING DYNAMIC ILLUSTRATIONS USING PRINCIPLES OF ANIMATION

BACKGROUND OF THE INVENTION

Field of the Invention

Embodiments of the present invention relate generally to computer animation and, more specifically, to techniques for generating dynamic illustrations using principles of animation.

Description of the Related Art

An animator may create traditional cartoon-style animation by sketching a sequence of still images. Each image in the sequence may include the same or similar objects as previous images, with the shapes and/or positions of those objects adjusted incrementally to represent motion. When the images in the sequence are viewed in rapid succession, those objects may appear to change shape and/or move.

Animators typically employ a variety of techniques to increase the realism of animations. For example, an animator may draw a cartoon face with eyes having an exaggerated size to convey a "surprised" facial expression. Or an animator may draw a running cartoon character with overly stretched-out legs, suggesting that the character is taking very large leaps. Generally, animators exaggerate certain elements within animations to emphasize those elements to the viewer. Such emphasis may help the animations appear more lifelike and convincing to viewers.

The process of creating traditional cartoon-style animations can be very tedious for several reasons. First, the number of images required to create an animation can be exceedingly large. For example, a conventional animation is displayed at 24 frames per second (FPS), meaning that in order to create a 5-minute animation, an animator needs to manually draw 7200 relatively similar images. Second, the objects within each successive image must be drawn with precision in order to create the appearance of smooth, lifelike motion. Meeting this particular requirement becomes especially difficult when several thousand images must be created. Finally, sketching the dynamics of exaggerated actions, as discussed above, further complicates the process of creating the overall sequence of images because extra care is required to convey those particular effects.

In view of these difficulties, computer-based tools have been created to automate certain aspects of the animation process. However, these conventional tools suffer from a number of drawbacks. First, conventional tools typically rely on underlying physical models of the objects being animated. Not only are physical models difficult to generate, these models usually must follow the laws of physics. As almost all viewers understand, though, cartoon-style animations do not necessarily obey the laws of physics. Consequently, tools that rely on physical models are oftentimes not very useful for creating cartoon-style animations.

Second, animators generally use a specific terminology that has evolved alongside animation. This animation-oriented terminology may refer to high-level animation effects such as squash-and-stretch, follow-through, and so forth. By contrast, conventional computer-based tools generally rely on low-level terminology and syntax that is associated more with physics and/or graphics processing than animation. For example, a graphics processing-oriented animation tool may refer to skeletons, influences, skins, voxels, and so forth. Because animators do not use the terminology associated with conventional physics and/or graphics processing-oriented tools, animators oftentimes find such tools difficult or impossible to use.

As the foregoing illustrates, what is needed in the art is a more effective approach to creating cartoon-style animation.

SUMMARY OF THE INVENTION

Various embodiments of the present invention set forth a computer-implemented method for generating an animation, the including generating a sketch element representative of a sketch input received from a user, determining a first motion amplifier that amplifies at least one attribute of a first type of motion, generating a first motion pathway associated with the first type of motion, and generating a plurality of frames associated with the sketch element based on the first motion amplifier and the first motion pathway to animate the sketch element.

At least one advantage of this approach is that cartoon-style animations can be created without reliance on complex physical simulations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A-4C illustrate how an arc amplifier can be implemented to animate a swimming shark, according to various embodiments of the present invention;

FIGS. 7A-7J illustrate how a secondary motion amplifier can be implemented to animate the tail and body of a fox, according to various embodiments of the present invention;

FIGS. 9A-9C illustrate how a staging amplifier can be implemented to animate a fast moving object, according to various embodiments of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
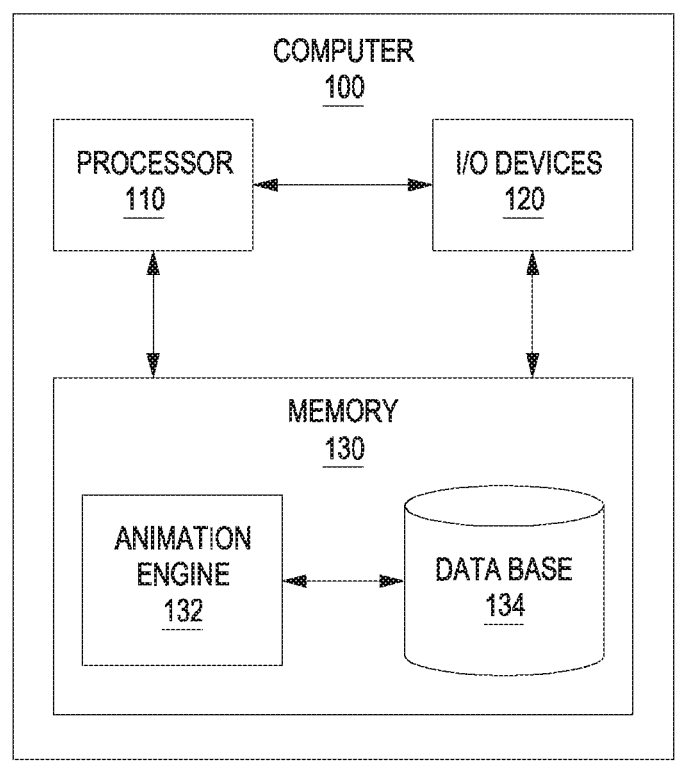
FIG. 1 illustrates a system configured to implement one or more aspects of the present invention.

FIG. 1 illustrates a system configured to implement one or more aspects of the present invention. As shown, a computing device 100 includes a processor 110, input/output (I/O) devices 120, and a memory 130, coupled together. Processor 110 may be any technically feasible form of processing device configured process data and execute program code. Processor 110 could be, for example, a central processing unit (CPU), a graphics processing unit (GPU), an application-specific integrated circuit (ASIC), a field-programmable gate array (FPGA), any technically feasible combination of such units, and so forth. I/O devices 120 may include devices configured to receive input, including, for example, a keyboard, a mouse, and so forth. I/O devices 120 may also include devices configured to provide output, including, for example, a display device, a speaker, and so forth. I/O devices 120 may further include devices configured to both receive and provide input and output, respectively, including, for example, a touchscreen, a universal serial bus (USB) port, and so forth.

Memory 130 may be any technically feasible storage medium configured to store data and software applications. Memory 130 could be, for example, a hard disk, a random access memory (RAM) module, a read-only memory (ROM), and so forth. Memory 130 includes animation engine 132 and database 134. Animation engine 132 is a software application that, when executed by processor 110, causes processor 110 to generate an animation. In doing so, animation engine 132 may retrieve data from, and store data to, database 134.

As described in greater detail below in conjunction with FIGS. 2A-2B, animation engine 132 is configured to receive various inputs from an end-user. Those inputs may represent static sketches to be animated by animation engine 132. The inputs may also represent control sketches according to which animation engine 132 generates an animation. Other inputs include the selection and configuration of various motion amplifiers ("amplifiers"), based on which animation engine 132 animates the static sketches relative to the control sketches.

Figure 2A:
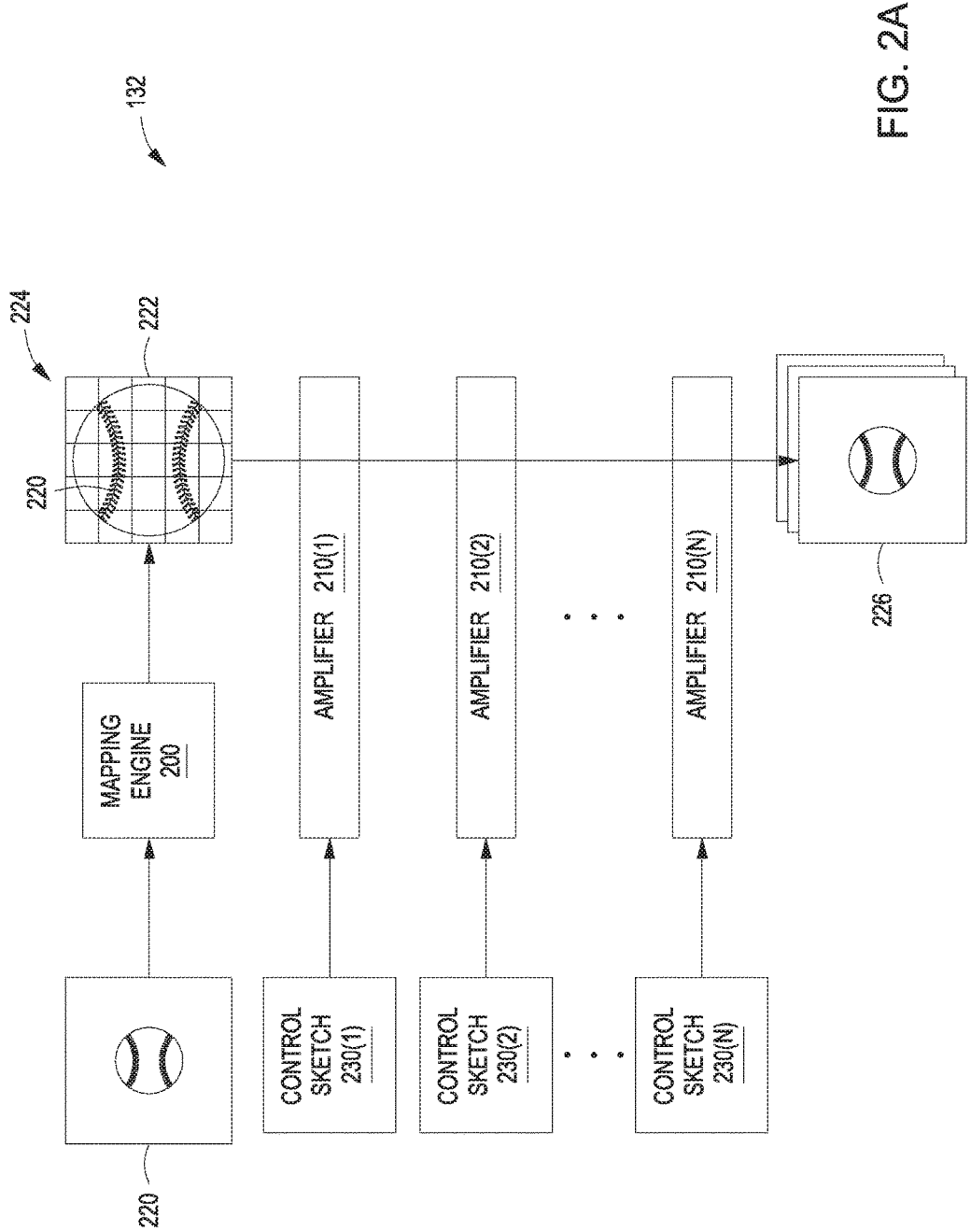
FIGS. 2A-2B is a more detailed illustration of the animation engine of FIG. 1 in operation, according to various embodiments of the present invention.
Figure 2B:
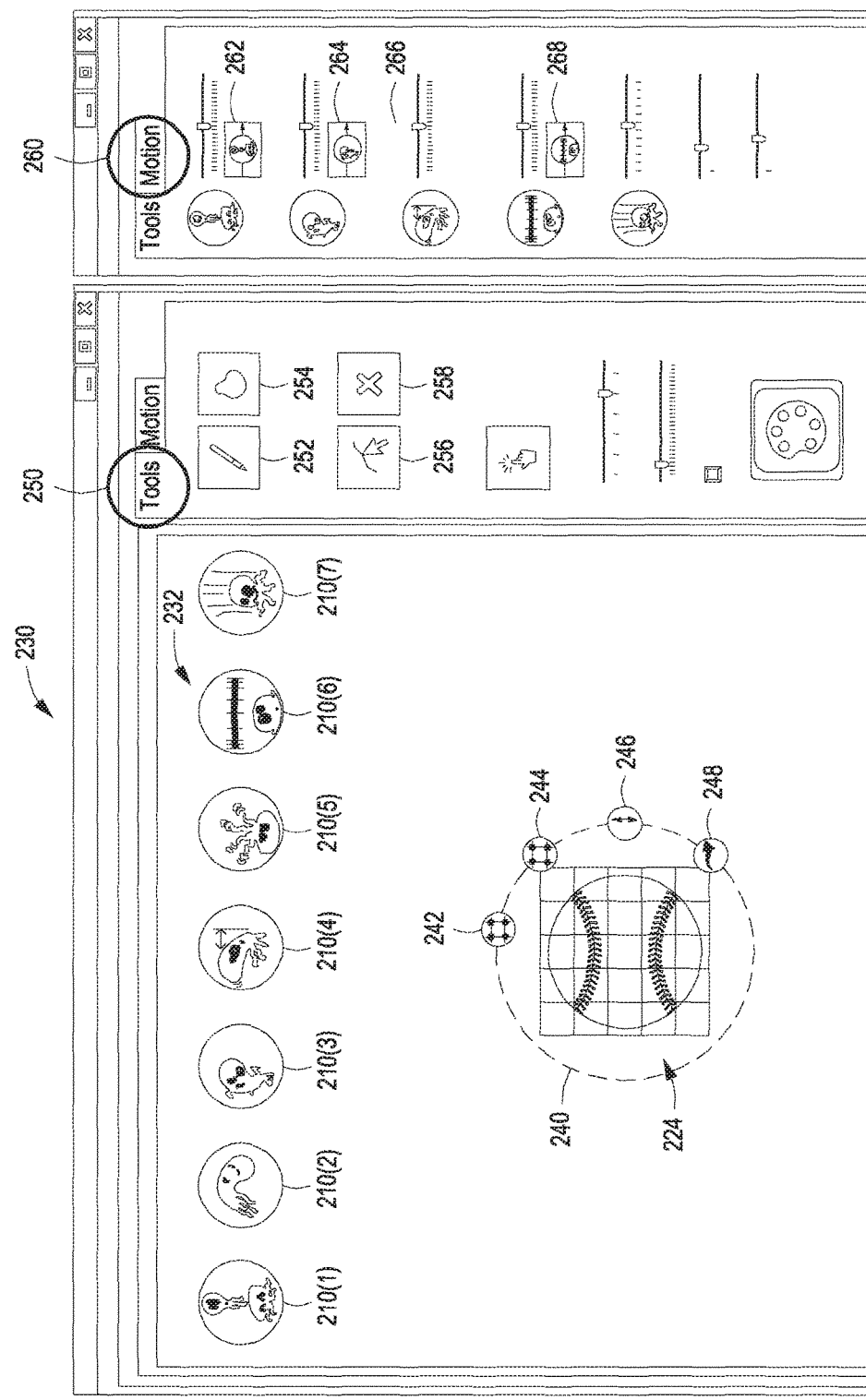

FIGS. 2A-2B are more detailed illustrations of the animation engine of FIG. 1 in operation, according to various embodiments of the present invention. As shown in FIG. 2A, animation engine 132 includes a mapping engine 200 and a set of amplifiers 210(1) through 210(N). Mapping engine 200 is configured to receive a sketch 220 from the end-user. Sketch 220 is generally a static drawing that may be generated using a set of tools exposed to the end-user via a graphical user interface (GUI). This GUI is generated by animation engine 132, and is described in greater detail below in conjunction with FIG. 2B. Mapping engine 200 is configured to project sketch 220 onto a sketch grid 222 in order to generate a sketch element 224. As referred to herein, a "sketch element" is a sketch input projected onto a sketch grid for the purposes of animating the sketch input via deformations applied to the sketch grid. In projecting sketch 220, mapping engine 200 may divide sketch 220 into a number of grid cells associated with sketch grid 222, where each grid cell includes a portion of sketch 220. Sketch grid also includes a number of grid points that represent intersections between the boundaries of adjacent grid cells. To animate sketch element 224, animation engine 132 deforms and/or moves sketch grid 222, and then interpolates portions of sketch 220 based on the deformations of corresponding grid cells.

Animation engine 132 applies one or more of amplifiers 210 to deform and/or move sketch grid 222, within the aforesaid GUI, in order to create an animation 226. Animation 226 includes a sequence of frames that, when viewed in succession, create the appearance that sketch 220 is moving. The end-user may select any combination of amplifiers 210 to apply to sketch grid 222. Each selected amplifier 210 may receive one or more control sketches 230 as input. A given control sketch 230 is an end-user generated sketch that influences the behavior of one or more selected amplifiers 210. Each selected amplifier 210 generally performs different and relatively independent operations with sketch grid 222, and so different combinations of amplifiers 210 can be selected in order to cause animation 226 to include diverse sketch dynamics. As mentioned above, the end-user interacts with animation engine 132 via a GUI, described in greater detail below in conjunction with FIG. 2B.

As shown in FIG. 2B, a GUI 230 includes amplifiers 210(1) through 210(7). Amplifier 210(1) is a "squash and stretch" amplifier and is described in greater detail below in conjunction with FIGS. 3A-3E. Amplifier 210(2) is an "arc" amplifier and is described in greater detail below in conjunction with FIGS. 4A-4C. Amplifier 210(3) is an "anticipation" amplifier and is described in greater detail below in conjunction with FIGS. 5A-5B. Amplifier 210(4) is a "drag" or "follow through" amplifier and is described in greater detail below in conjunction with FIGS. 6A-6C. Amplifier 210(5) is a "secondary motion" or "secondary" amplifier and is described in greater detail below in conjunction with FIGS. 7A-7J. Amplifier 210(6) is a "slow in/slow out" or "slow in out" amplifier and is described in greater detail below in conjunction with FIGS. 8A-8B. Amplifier 210(7) is a "staging" amplifier and is described in greater detail below in conjunction with FIGS. 9A-9C As also shown in FIG. 2B, GUI 230 includes a canvas area 232, a tools tab 250 and a motion tab 260. Tools tab 250 includes a stylus tool 252, a lasso tool 254, a select tool 256, and a cancel tool 258. Tools tab 250 may also include other tools and/or GUI elements. Motion tab 260 includes amplifier strength sliders 262, 264, 266, and 268, which control the strength with which amplifiers 210 are applied. Within canvas area 232, a marking menu 240 surrounds sketch element 224. Marking menu 240 includes a stationary point tool 242, a rigid point tool 244, a rotation tool 246, and a translation tool 248. The different tools included in marking menu 240 are implemented in conjunction with amplifiers 210, and are described in greater detail below in conjunction with FIGS. 3A-9C.

In operation, animation engine 132 generates sketch element 224 based on a sketch input, as described in conjunction with FIG. 2A. Animation engine 132 then displays marking menu 240 surrounding sketch element 224 after the end-user selects one or more of amplifiers 210. Animation engine 132 may then configure those amplifiers based on input received from the end-user via the different tools included in marking menu 240, tools tab 250, and motion tab 260. Stationary points tool 242 allows the end-user to define specific points within sketch element 224 that should remain stationary within canvas area 232 during animation via amplifiers 210. Rigid points tool 244 allows the end-user to define specific points within sketch element 224 that should maintain a rigid shape relative to one another, yet be allowed to move within canvas area 232 during animation via amplifiers 210. Rotation tool 246 allows the end-user to provide a rotation-type control sketch 230 that reflects a rotation motion to be applied to some or all of sketch element 224 during animation via amplifiers 210. Translation tool 248 allows the end-user to provide a translation-type control sketch 230 that reflects a translation motion to be applied to some or all of sketch element 224 during animation via amplifiers 210. These different tools are described in greater detail, by way of example, below in conjunction with FIGS. 3A-9C.

Exemplary Animations Generated Via the Amplifiers within the Animation Engine

FIGS. 3A-3E illustrate how squash-and-stretch amplifier 210(1) can be implemented to animate a bouncing ball, according to various embodiments of the present invention. As shown in FIGS. 3A-3E, a sketch element 324 includes a sketch of a ball that travels along a translation control sketch (referred to hereinafter as "translation sketch") 330. Each of FIGS. 3A-3E illustrates a slightly different version of sketch element 324, modified to represent squash-and-stretch type animation. Persons skilled in the art of animation will recognize that "squash and stretch" is one of the well-known twelve Principles of Animation.

Figure 3E:
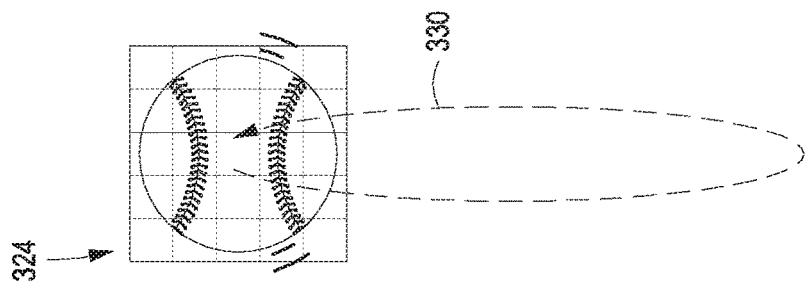
FIGS. 3A-3E illustrate how a squash-and-stretch amplifier can be implemented to animate a bouncing ball, according to various embodiments of the present invention.
Figure 3D:
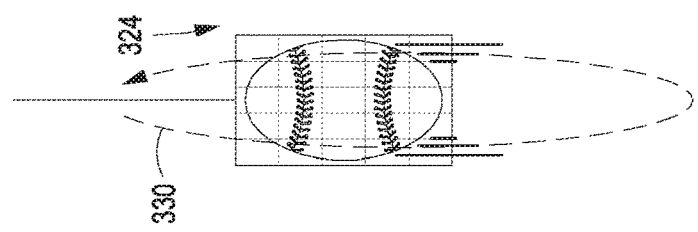
Figure 3C:
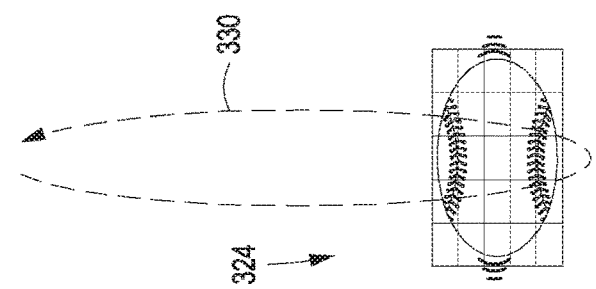

Translation sketch 330 is a user-generated control sketch received by animation engine 132 via translation tool 248. The end-user may select translation tool 248, and then draw translation sketch 330 within canvas area 232 to indicate a path along which sketch element 324 should travel. Sketch element 324 in FIG. 3A represents an initial state of sketch element 324 before traversal of translation sketch 330. During traversal of translation sketch 330, animation engine 132 deforms sketch element 324 by deforming the underlying sketch grid to represent exaggerated motion of the ball.

Figure 3B:
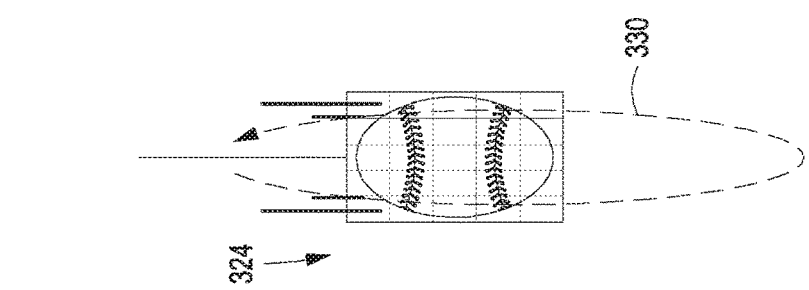
Figure 3A:
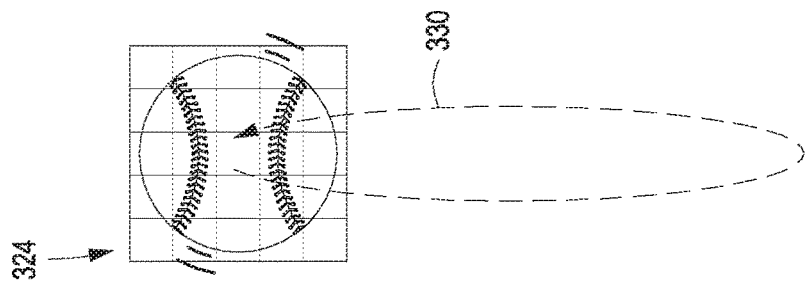

For example, as sketch element 324 falls in FIG. 3B, animation engine 132 stretches sketch element 324 to exaggerate a falling motion. In FIG. 3C, when sketch element 324 changes directions, animation engine 132 squashes sketch element 324 to exaggerate a bouncing motion. In FIG. 3D, animation engine 132 stretches sketch element 324 again to exaggerate a rising motion. Once traversal of translation sketch 330 is complete, as shown in FIG. 3E, sketch element 324 assumes a final state. When deforming sketch element 324, animation engine 132 adjusts vertical and horizontal scaling factors associated with the underlying sketch grid to create squash or stretch effects. The magnitude of these adjustments can be set by the end-user via GUI elements in motion tab 260. To generate different frames of animation 226, animation engine 132 interpolates the underlying sketch based on the scaled dimensions of the sketch grid.

Animation engine 132 is configured to create animation 226 to include a series of still images similar to those shown in FIGS. 3A-3E. Animation engine 132 may create animation 226 with any granularity in order to illustrate smooth bouncing motion. Also, animation engine 132 may loop animation 226, so that the ball shown in FIGS. 3A-3E appears to bounce continuously.

FIGS. 4A-4C illustrate how arc amplifier 210(2) can be implemented to animate a shark swimming along an arc, according to various embodiments of the present invention. As shown in FIGS. 4A-4C, a sketch element 424 includes a sketch of a shark that travels along a translation sketch 430. Each of FIGS. 4A-4C illustrates a different version of sketch element 424, deformed to follow different portions of control sketch 430, shown as 430(A) through 430(C). Persons skilled in the art of animation will recognize that "arc following" is one of the well-known twelve Principles of Animation.

Like translation sketch 330 discussed above in conjunction with FIGS. 3A-3E, translation sketch 430 is a user-generated control sketch received by animation engine 132 via translation tool 248. The end-user may select translation tool 248, and then draw translation sketch 430 within canvas area 232 to indicate a path along which sketch element 424 should travel. With arc amplifier 210(2) selected, animation engine 132 identifies a central axis 400 of sketch element 424 that, by default, is constrained to travel along control sketch 430 and is thus aligned with the direction of motion.

When constrained in this manner, each grid point in central axis 400 may reside at a certain distance from neighboring grid points during animation. However, this distance may change when other amplifiers, such as squash-and-stretch amplifier 210(1), are applied. The other grid points associated with sketch element 424 (those not included in central axis 400) are permitted to move relative to central axis 400. These other grid points are simulated as particles with applied forces that direct those particles to target locations relative to central axis 400. In one embodiment, these forces are computed based on a shape matching technique. Generally, with arc amplifier 210(1) applied, animation engine 132 deforms sketch element 424 to follow contours of translation sketch 430 during traversal.

Thus, when sketch element 424 moves towards the upper portion of translation sketch 430, shown as portion 430(B) in FIG. 4B, the top of sketch element 424 expands while the bottom of sketch element 424 contracts. Likewise, when sketch element 424 moves towards the lower portion of translation sketch 430, shown as portion 430(C) in FIG. 4C, the top of sketch element 424 contracts while the bottom of sketch element 424 expands. The arc-following motion depicted in FIGS. 4A-4C may be implemented to represent cartoon-style swimming, flying, or other forms of traveling motion without relying on an underlying physical model or skeleton.

Figure 5B:
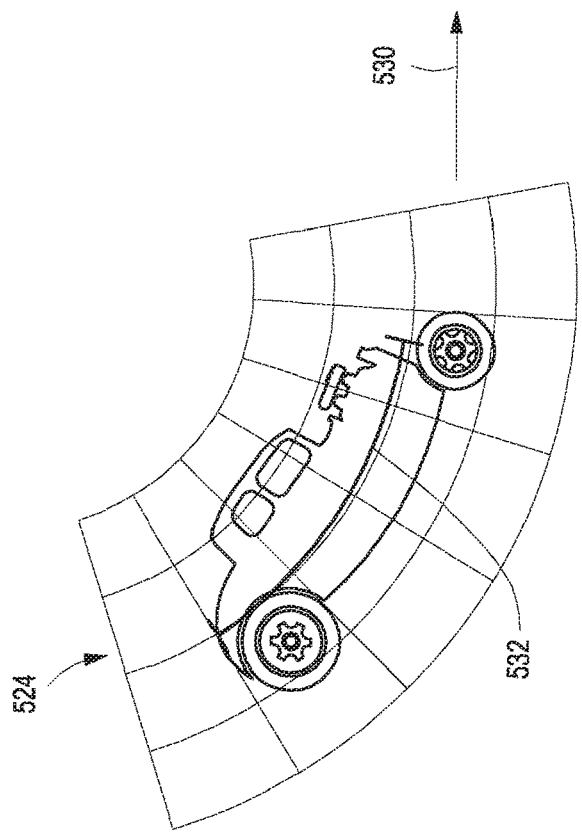
FIGS. 5A-5B illustrate how an anticipation amplifier can be implemented to animate an accelerating car, according to various embodiments of the present invention.
Figure 5A:
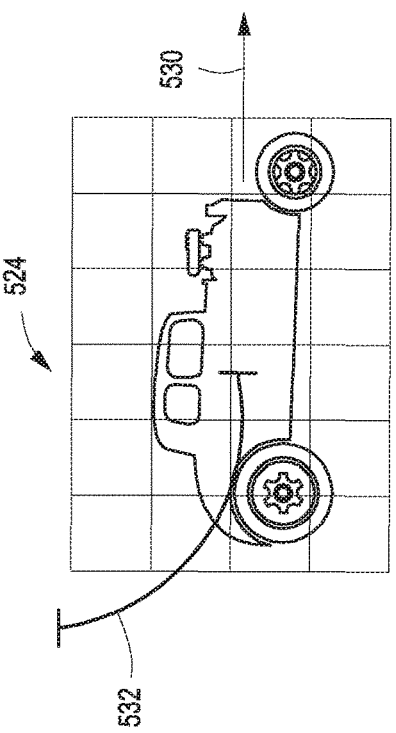

FIGS. 5A-5B illustrate how anticipation amplifier 210(3) can be implemented to animate an accelerating car, according to various embodiments of the present invention. As shown in FIGS. 5A-5B, a sketch element 524 includes a sketch of a car configured to travel along a translation sketch 530. FIGS. 5A-5B also illustrate an anticipation sketch 532 that defines an "anticipation pose" that sketch element 524 assumes prior to traversal of control sketch 530. Anticipation sketch 532 is a control sketch that is drawn by the end-user after selecting anticipation amplifier 210(3). Persons skilled in the art of animation will recognize that "anticipation" is one of the well-known twelve Principles of Animation.

In FIG. 5A, sketch element 524 is shown prior to assuming the anticipation pose mentioned above. In FIG. 5B, sketch grid 524 is shown deformed to align with anticipation sketch 532. Animation engine 132 is configured to deform the sketch grid associated with sketch element 524 to align with anticipation sketch 532 using analogous techniques to those described above in conjunction with FIGS. 4A-4C. In particular, animation engine 132 identifies a central axis along sketch element 524, and then deforms sketch element 524 as a whole relative to that axis. When animation engine 132 causes sketch element 524 to assume the anticipation pose, animation engine may linearly interpolate the underlying sketch grid between a default position and the anticipation pose, and likewise interpolate the underlying sketch.

Once animation engine 132 deforms sketch element 524 to assume the anticipation pose, animation engine 132 then animates sketch element 524 exiting the anticipation pose and traversing translation sketch 530, again linearly interpolating between the anticipation pose and the default position prior to traversal of translation sketch 530.

Based on the deformation of sketch element 524 and the associated sketch grid, animation engine interpolates the underlying car sketch to simulate the anticipation pose and subsequent traversal of translation sketch 530. Thus, animation engine 132 can simulate the high-level "anticipation" effect using straightforward and intuitive tools.

Figure 6C:
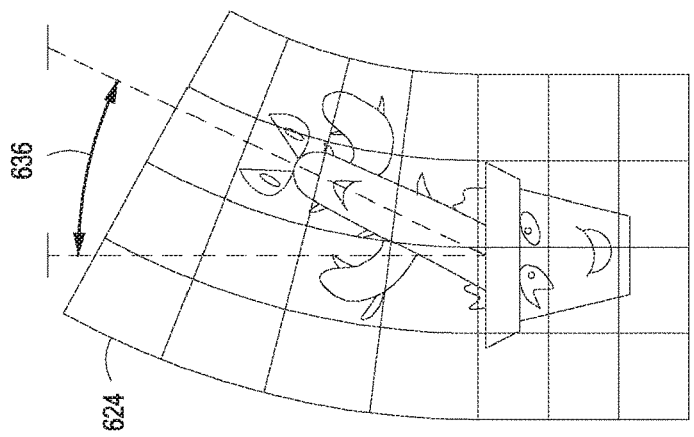
FIGS. 6A-6C illustrate how a follow-through amplifier can be implemented to animate a sliding cactus, according to various embodiments of the present invention.
Figure 6B:
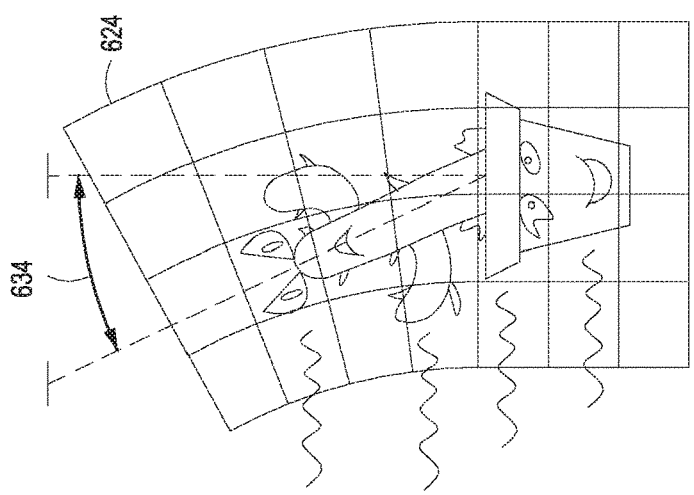
Figure 6A:
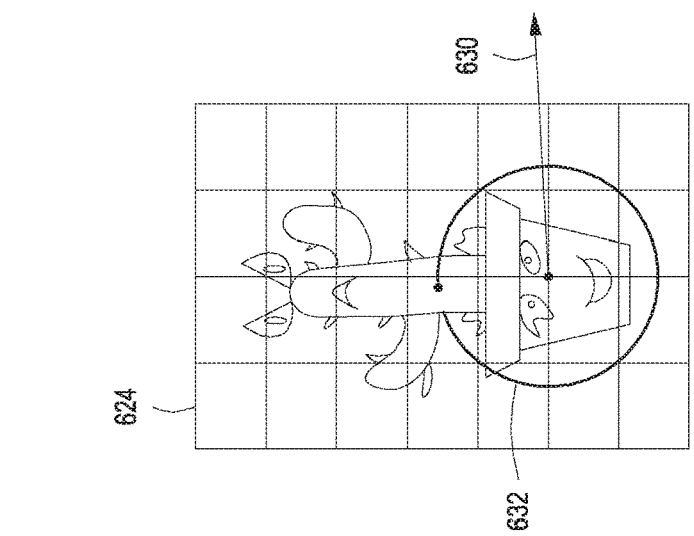

FIGS. 6A-6C illustrate how follow-through amplifier 210(4) can be implemented to animate a sliding cactus, according to various embodiments of the present invention. As shown in FIGS. 6A-6C, a sketch element 624 represents a sketch of a cactus in a pot sliding along a surface and then slowing to a stop. During sliding and stopping, the cactus is shown to sway backwards and forwards, an effect known in the art as "follow-through." Persons skilled in the art of animation will recognize that "follow-through," also known as "drag," is one of the well-known twelve Principles of Animation.

In FIG. 6A, animation engine 132 receives translation sketch 630 from the end-user, which represents a trajectory for sketch element 624 to follow. Animation engine 132 also receives control sketch 632 that indicates rigid points within sketch grid 622. Rigid points tool 244 may be implemented to draw control sketch 632, thereby indicating that the pot is a rigid object that can translate but not deform. In one embodiment, animation engine 132 designates a central horizontal axis within sketch element 624 to be a set of rigid grid points.

In FIG. 6B, sketch element 624 travels to the right along control sketch 630, and the non-rigid portion of sketch element 624 (which includes the cactus) deforms to the left, indicating that the cactus sways backwards in response to forward motion. In one embodiment, the end-user may specify a maximum backward sway angle 634 by inputting a control sketch and/or adjusting a GUI slider within motion tab 260.

In FIG. 6C, sketch element 624 comes to a stop, and the non-rigid portion of sketch element 624 deforms to the right, indicating that the cactus sways forwards in response to deceleration. In one embodiment, the end-user may specify a maximum forward sway angle 636 by inputting a control sketch and/or adjusting a GUI slider within motion tab 260.

Based on the deformations discussed above in conjunction with FIGS. 6A-6C, animation engine 132 is configured to interpolate the underlying sketch of the potted cactus, based on deformations applied to the associated sketch grid, in order to animate the sliding and bending of the cactus. Thus, without depending on an underlying physical model, animation engine 132 provides the ability to create cartoon-style animations with exaggerated physical dynamics.

FIGS. 7A-7J illustrate how secondary motion amplifier 210(5) can be implemented to animate the tail and body of a fox, according to various embodiments of the present invention. Persons skilled in the art of animation will recognize that "secondary motion" is one of the well-known twelve Principles of Animation. Each of FIGS. 7A-7J illustrates a different step in the process of applying secondary motion amplifier 210(4) to sketch elements 700 and 710.

In FIG. 7A, sketch elements 700 and 710 represent underlying sketches of the body and tail of a fox, respectively. When the end-user selects secondary motion amplifier 210(4), animation engine 132 applies deformations to sketch element 710 relative to other deformations applied to sketch element 700. In FIG. 7B, animation engine 132 receives control sketch 730 that indicates, as shown in FIG. 7C, rigid points 712 of sketch element 710. The other non-rigid points of sketch element 710 are shown as deformable points 714. In FIG. 7D, animation engine 132 receives rotation sketch 732. Rotation sketch 732 is a control sketch that indicates rotational motion to be applied to the rigid portion of sketch element 710. Animation engine 132 also receives control sketch 734 that specifies an angular limit to that rotation. In FIG. 7E, animation engine 132 displays sketch element 710 swaying back and forth, which represents a tail-wagging motion performed by the fox. The body of the fox, however, remains stationary until additional inputs are received by animation engine 132, as described in FIGS. 7F-7J.

In FIG. 7F, animation engine 132 receives control sketch 736, which indicates, as shown in FIG. 7G, stationary points 702 and deformable points 704. In FIG. 7H, animation engine 132 receives control sketch 738. Control sketch 738 explicitly links sketch elements 700 and 710 and indicates that these sketch elements should be animated to illustrate secondary motion. In FIG. 7I, animation engine 132 receives rotation sketch 740. Rotation sketch 740 is a control sketch that represents rotational motion to be applied to sketch element 700. Animation engine 132 also receives control sketch 742 that specifies an angular limit to that rotation. In FIG. 7J, animation engine 132 displays sketch element 700 swaying back and forth and, additionally, sketch element 710 swaying back and forth relative to sketch element 700. This configuration of sketch elements, and the associated dynamics, is meant to depict the body of the fox moving and the tail of the fox moving relative to the body of the fox.

Once animation engine 132 generates sketch elements 700 and 710, based on user input, and also receives the different control sketches discussed above, animation engine 132 then applies the associated deformations to the underlying sketch grids associated with sketch elements 700 and 710 in a looped manner to create a continuous animation. Animation engine 132 also interpolates the underlying sketches, based on the deformations applied to the associated sketch grids, in order to smoothly animate those sketches.

Figure 8A:
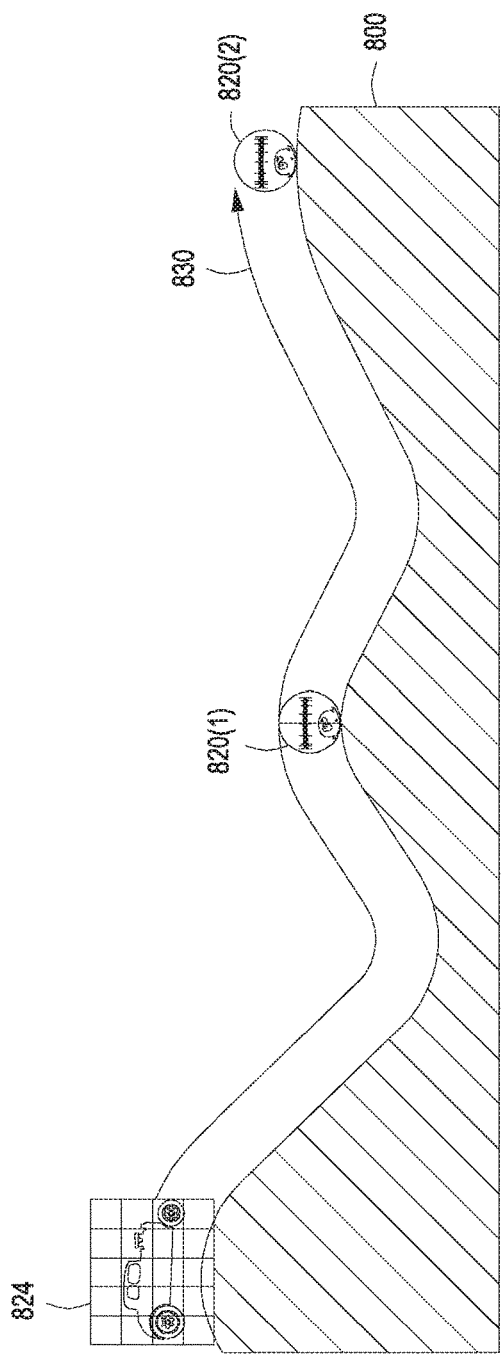
FIGS. 8A-8B illustrate how a slow in/slow out amplifier can be implemented to animate a car driving over hills, according to various embodiments of the present invention.
Figure 8B:
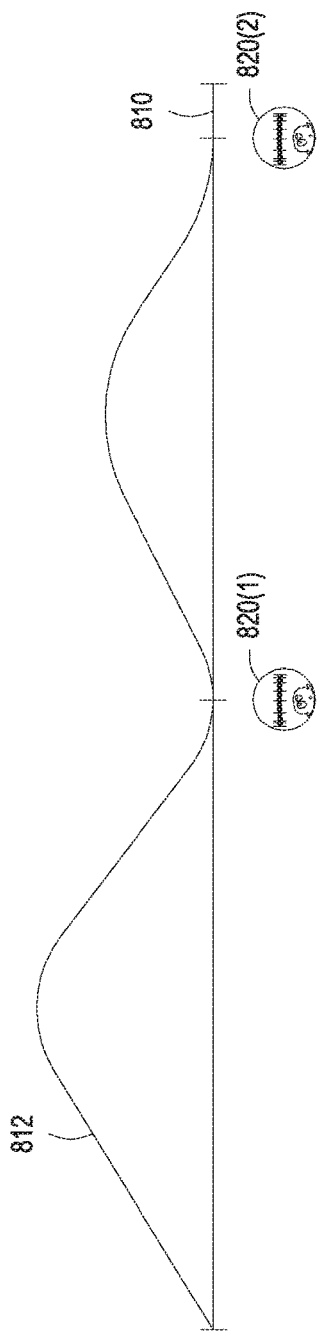

FIGS. 8A-8B illustrate how slow in/slow out amplifier 210(6) can be implemented to animate a car driving over hills, according to various embodiments of the present invention. Persons skilled in the art of animation will recognize that "slow in/slow out" is one of the well-known twelve Principles of Animation. As shown in FIG. 8A, a sketch element 824 represents a sketch of a car. Sketch element 824 is configured to follow a translation sketch 830 across a set of hills 800. Translation sketch 830 may represent an arc that sketch element 824 follows, in like fashion as described above in conjunction with FIGS. 4A-4D. Thus, sketch element 824 may be configured to deform based on the contours of translation sketch 830. Various slow in/slow out breakpoints 820(1) and 820(2) are placed along translation sketch 830 to indicate regions where the velocity of sketch element 824 changes during traversal of translation sketch 830, as described in greater detail below in conjunction with FIG. 8B.

As shown in FIG. 8B, a motion axis 810 includes a velocity profile 812. Motion axis 810 corresponds to the linear translation of sketch element 824 across translation sketch 830. Velocity profile 812 indicates the velocity of sketch element 824 at different positions along translation sketch 830. For example, when sketch element 824 accelerates down the first large hill, velocity profile 812 reaches a maximum peak. Slow in/slow out breakpoints 820(1) and 820(2), shown in both FIGS. 8A and 8B, represent positions along motion axis 810 where sketch element 824 decelerates upon approach, and then slowly accelerates when leaving. For example, when sketch element 824 ascends the second hill, slow in/slow out breakpoint 820(1) causes sketch element 824 to slow down, as indicated by the decrease in velocity profile 812 at that location. Likewise, when sketch element 824 descends the second hill, slow in/slow out break point 820(1) causes sketch element 824 to slowly accelerate up to a higher velocity associated with rolling down the second hill.

Referring generally to FIGS. 8A-8B, slow in/slow out break points 820 are associated with slow in/slow out amplifier 210(6) and can be applied to velocity profiles in order to create physically realistic motion. Slow in/slow out break points 820 can be applied to any of the types of motion discussed herein, including translational or rotational motion. Generally, animation engine 132 does not necessarily deform sketch grid 822 in response to slow in/slow out breakpoints 820, and may simply adjust the velocity and/or acceleration of that sketch grid. In this manner, slow in/slow out amplifier 210(6) can be used in conjunction with a velocity profile to help artists control the timing and pacing of sketches, instead of relying on conventional keyframing.

FIGS. 9A-9C illustrate how staging amplifier 210(7) can be implemented to animate a fast moving object, according to various embodiments of the present invention. Persons skilled in the art of animation will recognize that "staging" is one of the well-known twelve Principles of Animation. As shown, a sketch element 924 represents a sketch of a triangle object. Animation engine 132 is configured to receive a translation sketch 930 to indicate that the triangle should be animated moving to the right. In FIG. 9B, animation engine 132 identifies grid points 900(1), 900(2), and 900(3) associated with a trailing edge of the triangle object. In doing so, animation engine 132 may identify a number of grid cells that include at least a portion of the underlying sketch, and then select grid points associated with those grid cells. In FIG. 9C, animation engine generates dynamic motion trails 910(1), 910(2), and 910(3) emanating from grid points 910(1), 910(2), and 910(3), respectively. Animation engine 132 may animate dynamic motion trails 910 to simulate a waving or flapping motion. In this manner, animation engine 132 exaggerates the traveling motion of sketch element 924.

Referring generally to FIGS. 3A-9C, the various amplifiers 210 discussed in exemplary fashion in these Figures can be combined in any technically feasible manner in order to apply multiple Principles of Animation to a single sketch. For example, FIGS. 8A-8B illustrate a combination of arc following, implemented via amplifier 210(2), and slow in/slow out, implemented via amplifier 210(6). Other combinations of amplifiers 210 are also possible. For example, amplifier 210(4) (follow-through) may be combined with amplifier 210(7) (staging) in order to exaggerate the motion of certain sketch elements. Further, the degree to which animation engine 132 deforms the underlying sketch grid during animation, based on one or more amplifiers 210, is controllable via GUI sliders in motion tab 260. The specific techniques discussed in exemplary fashion above are also described in stepwise fashion below in conjunction with FIGS. 10-11.

Procedure Implemented by the Animation Engine to Generate Animations

Figure 10:
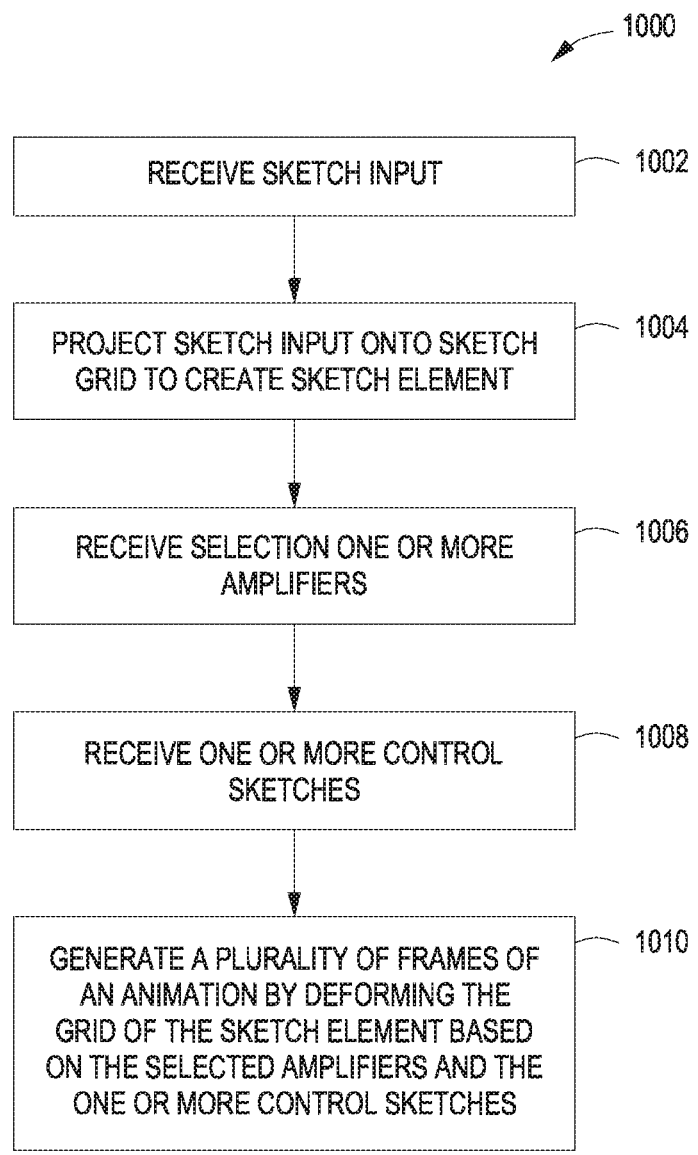
FIG. 10 is a flow diagram of method steps for applying one or more amplifiers to create an animation, according to various embodiments of the present invention.

FIG. 10 is a flow diagram of method steps for applying one or more amplifiers to create an animation, according to various embodiments of the present invention. Although the method steps are described in conjunction with the systems of FIGS. 1-9C, persons skilled in the art will understand that any system configured to perform the method steps, in any order, is within the scope of the present invention.

As shown, a method 1000 begins at step 1002, where animation engine 132 receives a sketch input from an end-user. The end-user could provide the sketch input, for example, by drawing a shape using stylus tool 252. At step 1004, mapping engine 200 within animation engine 132 projects the sketch input onto a sketch grid to create a sketch element. The sketch grid divides the sketch input into a number of different portions, where each portion falls within a different cell of the sketch grid. During animation, animation engine 132 is configured to deform the sketch grid, and then interpolate portions of the sketch input to reflect the deformations applied to the sketch grid.

At step 1006, animation engine 132 receives a selection of one or more amplifiers 210. Animation engine 132 could, for example, receive a selection of arc amplifier 210(2) as well as a selection of staging amplifier 210(7). Any combination of amplifiers may be selected at step 1006. At step 1008, animation engine 132 receives one or more control sketches 230. The control sketches received at step 1008 could be translation sketches generated via translation tool 248, rotation sketches received via rotation tool 246, or any of the other types of control sketches discussed above in conjunction with FIGS. 3A-9C.

At step 1010, animation engine 132 generates a plurality of frames of an animation by deforming the sketch grid of the sketch element generated at step 1004, based on the amplifiers selected at step 1006 and based on the control sketches received at step 1008. In performing step 1010, animation engine 132 may deform the sketch grid and then interpolate the associated sketch input by implementing a technique described in greater detail below in conjunction with FIG. 11.

Figure 11:
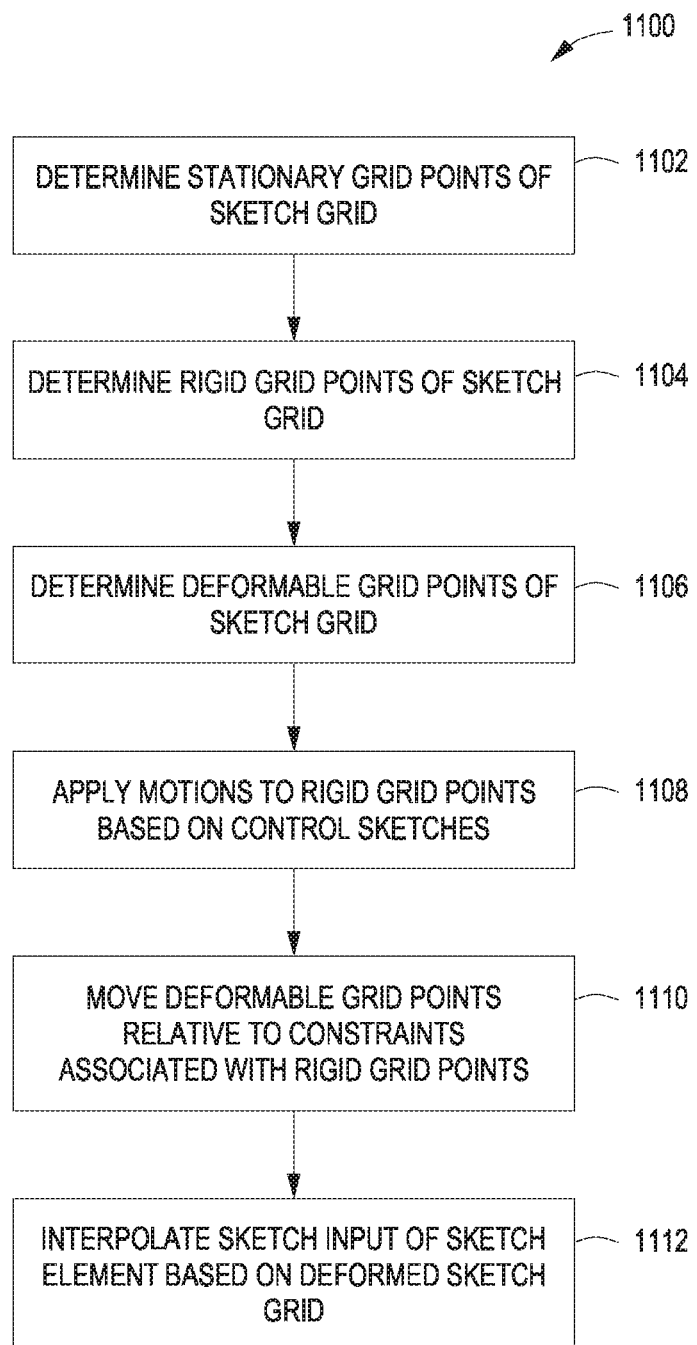
FIG. 11 is a flow diagram of method steps for deforming a sketch grid to animate a sketch element, according to various embodiments of the present invention.

FIG. 11 is a flow diagram of method steps for deforming a sketch grid in order to animate a sketch, according to various embodiments of the present invention. Although the method steps are described in conjunction with the systems of FIGS. 1-9C, persons skilled in the art will understand that any system configured to perform the method steps, in any order, is within the scope of the present invention.

As shown, a method 1100 begins at step 1102, where animation engine 132 determines a set of stationary grid points of a sketch grid. Animation engine 132 could, for example, receive a selection of grid points from the end-user via stationary points tool 242 to determine the stationary grid points. The stationary grid points determined at step 1102 represent grid points that are fixed within the canvas 232 and do not move during animation.

At step 1104, animation engine 132 determines a set of rigid grid points of the sketch grid. Animation engine 132 could, for example, receive a selection of grid points from the end-user via rigid points tool 244 to determine the rigid grid points. The rigid grid points determined at step 1104 represent grid points that maintain relative positions to one another, yet are capable of moving within canvas 232 during animation.

At step 1106, animation engine 132 determines a set of deformable grid points within the sketch grid. Animation engine 132 may determine the deformable points by identifying any grid points not already designated as stationary grid points or rigid grid points.

At step 1108, animation engine 132 applies motions to the rigid grid points relative to constraints associated with the rigid grid points. For example, the rigid grid points could represent a central axis of a sketch element that is constrained to travel along an arc drawn by the end-user. In this example, each rigid grid point within the central axis would be constrained to maintain a fixed distance to one or more neighboring grid points in the central axis, yet be permitted to move with respect to those constraints.

At step 1110, animation engine 132 moves the deformable grid points relative to the constraints associated with the rigid grid points. Animation engine 132 may implement a shape matching technique in order to move the deformable grid points. In doing so, animation engine 132 may apply forces to each deformable grid point that direct each such point towards a default position. Thus, the deformable grid points would be loosely coupled to the rigid grid points, thereby simulating realistic motion.

At step 1112, animation engine 132 interpolates the sketch input of the sketch element based on the deformed sketch grid. In doing so, animation engine 132 may interpolate individual portions of the sketch input that fall within individual grid cells based on the deformations applied to those grid cells. In operation, animation engine 132 performs the method 1100 repeatedly in order to generate successive frames of animation 226. Animation engine 132 may also create an animated loop of those frames for display to the end-user.

In sum, an animation engine is configured to apply motion amplifiers to sketches received from an end-user in order to create exaggerated, cartoon-style animation. The animation engine receives a sketch input from the end-user as well as a selection of one or more motion amplifiers. The animation engine also receives one or more control sketches that indicate how the selected motion amplifiers are applied to the sketch input. The animation engine projects the sketch input onto a sketch grid to create a sketch element, and then animates the sketch element by deforming the underlying sketch grid based on the control sketches. The animation engine then interpolates the sketch input, based on the deformations of the sketch grid, to animate the sketch.

At least one advantage of the approach discussed herein is that cartoon-style animations can be created without reliance on complex physical simulations. Further, the motion amplifiers implemented by the animation engine are derived from the well-known twelve Principles of Animation. Thus, animators may rely on existing understanding of these Principles and the associated terminology when using the amplifiers. Accordingly, animators are not required to learn a completely new and complex framework commonly associated with conventional physics and/or graphics-based tools.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM); a read-only memory (ROM), an erasable programmable read-only memory (EPROM or Flash memory), an optical fiber; a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine; such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for generating an animation, the method comprising:
   generating a sketch element representative of a sketch input received from a user by projecting the sketch input onto a sketch grid;
   receiving a plurality of motion amplifiers for one or more types of motion and a plurality of control sketches, wherein each motion amplifier included in the plurality of motion amplifiers amplifies at least one attribute of a type of motion included in the one or more types of motion, each control sketch included in the plurality of control sketches indicates how to apply a corresponding motion amplifier to the sketch grid, and each motion amplifier included in the plurality of motion amplifiers corresponds to a Principle of Animation included in the Twelve Principles of Animation;
   generating a first motion pathway associated with a first type of motion included in the one or more types of motion;
   modifying the sketch element by modifying the sketch grid based on the plurality of motion amplifiers, the plurality of control sketches, and the first motion pathway and modifying the sketch input received from the user based on the modified sketch grid; and
   generating a plurality of frames associated with the sketch element based on the modified sketch element to animate the sketch element.

2. The computer-implemented method of claim 1, wherein modifying the sketch element comprises:
   deforming the sketch grid based on the plurality of motion amplifiers and the first motion pathway to generate a deformed sketch grid; and
   modifying the sketch input based on the deformed sketch grid.

3. The computer-implemented method of claim 1, wherein modifying the sketch element comprises:
   translating the sketch grid based on the plurality of motion amplifiers and along the first motion pathway to generate a translated sketch grid; and
   moving the sketch input based on the translated sketch grid.

4. The computer-implemented method of claim 1, wherein the first motion pathway comprises a linear trajectory that the sketch element traverses.

5. The computer-implemented method of claim 4, wherein a first motion amplifier included in the plurality of motion amplifiers increases or decreases a velocity with which the sketch element traverses the linear trajectory.

6. The computer-implemented method of claim 1, wherein the first motion pathway comprises a rotational trajectory along which the sketch element rotates.

7. The computer-implemented method of claim 6, wherein a first motion amplifier included in the plurality of motion amplifiers increases or decreases a rotational velocity with which the sketch element rotates along the rotational trajectory.

8. The computer-implemented method of claim 1, wherein the plurality of motion amplifiers includes a first motion amplifier that amplifies at least one attribute of the first type of motion, the method further comprising:
   determining a second motion amplifier included in the plurality of motion amplifiers that amplifies at least one attribute of a second type of motion included in the one or more types of motion;
   generating a second motion pathway associated with the second type of motion; and
   generating a second plurality of frames associated with the sketch element based on the second motion amplifier and the second motion pathway to further animate the sketch element.

9. The computer-implemented method of claim 1, wherein the plurality of motion amplifiers includes two or more motion amplifiers that amplify at least one attribute of the first type of motion.

10. A non-transitory computer-readable medium storing instructions that, when executed by a processor, cause the processor to generate an animation by performing the steps of:
    generating a sketch element representative of a sketch input received from a user by projecting the sketch input onto a sketch grid;
    receiving a plurality of motion amplifiers for one or more types of motion and a plurality of control sketches, wherein each motion amplifier included in the plurality of motion amplifiers amplifies at least one attribute of a type of motion included in the one or more types of motion, each control sketch included in the plurality of control sketches indicates how to apply a corresponding motion amplifier to the sketch grid, and each motion amplifier included in the plurality of motion amplifiers corresponds to a Principle of Animation included in Twelve Principles of Animation;
    generating a first motion pathway associated with a first type of motion included in the one or more types of motion;
    modifying the sketch element by modifying the sketch grid based on the plurality of motion amplifiers, the plurality of control sketches, and the first motion pathway and modifying the sketch input received from the user based on the modified sketch grid; and
    generating a plurality of frames associated with the sketch element based on the modified sketch element to animate the sketch element.

11. The non-transitory computer-readable medium of claim 10, wherein modifying the sketch element comprises:
    deforming the sketch grid based on the plurality of motion amplifiers and the first motion pathway to generate a deformed sketch grid; and
    modifying the sketch input based on the deformed sketch grid.

12. The non-transitory computer-readable medium of claim 10, wherein modifying the sketch element comprises:
    translating the sketch grid based on the plurality of motion amplifiers and along the first motion pathway to generate a translated sketch grid; and
    moving the sketch input based on the translated sketch grid.

13. The non-transitory computer-readable medium of claim 10, wherein the first motion pathway comprises a linear trajectory that the sketch element traverses.

14. The non-transitory computer-readable medium of claim 13, wherein a first motion amplifier included in the plurality of motion amplifiers increases or decreases a velocity with which the sketch element traverses the linear trajectory.

15. The non-transitory computer-readable medium of claim 10, wherein the first motion pathway comprises a rotational trajectory along which the sketch element rotates.

16. The non-transitory computer-readable medium of claim 15, wherein a first motion amplifier included in the plurality of motion amplifiers increases or decreases a rotational velocity with which the sketch element rotates along the rotational trajectory.

17. The non-transitory computer-readable medium of claim 10, wherein the plurality of motion amplifiers includes a first motion amplifier that amplifies at least one attribute of the first type of motion, the computer-readable medium further storing instructions that, when executed by the processor, cause the processor to perform the steps of:
   determining a second motion amplifier included in the plurality of motion amplifiers that amplifies at least one attribute of a second type of motion included in the one or more types of motion;
   generating a second motion pathway associated with the second type of motion;
   generating a second plurality of frames associated with the sketch element based on the second motion amplifier and the second motion pathway to further animate the sketch element.

18. A system for generating an animation, comprising:
   a memory that includes an animation application; and
   a processor that, when executing the animation application, is configured to:
      generate a sketch element representative of a sketch input received from a user by projecting the sketch input onto a sketch grid,
      receive a plurality of motion amplifiers for one or more types of motion and a plurality of control sketches, wherein each motion amplifier included in the plurality of motion amplifiers amplifies at least one attribute of a type of motion included in the one or more types of motion, each control sketch included in the plurality of control sketches indicates how to apply a corresponding motion amplifier to the sketch grid, and each motion amplifier included in the plurality of motion amplifiers corresponds to a Principle of Animation included in the Twelve Principles of Animation,
      generate a first motion pathway associated with a first type of motion included in the one or more types of motion,
      modify the sketch element by modifying the sketch grid based on the plurality of motion amplifiers, the plurality of control sketches, and the first motion pathway and modifying the sketch input received from the user based on the modified sketch grid, and
      generate a plurality of frames associated with the sketch element based on the modified sketch element to animate the sketch element.

19. The system of claim 18, wherein the processor modifies the sketch element by:
   deforming the sketch grid based on the plurality of motion amplifiers and the first motion pathway to generate a deformed sketch grid; and
   modifying the sketch input based on the deformed sketch grid.

* * * * *